United States Patent [19]

Feldman et al.

[11] 3,852,481
[45] Dec. 3, 1974

[54] SYNTHETIC GRINDER GAS AROMAS AND PROCESSES

[75] Inventors: Jacob R. Feldman, New City; Matthew Hamell, Orangeburg, both of N.Y.; Ellen Danielczik, Fort Lee, N.J.

[73] Assignee: General Foods Corporation, White Plains, N.Y.

[22] Filed: June 2, 1972

[21] Appl. No.: 258,961

Related U.S. Application Data

[63] Continuation of Ser. No. 18,296, March 10, 1970, abandoned.

[52] U.S. Cl. ............................................... 426/65
[51] Int. Cl. ............................................. A23l 1/26
[58] Field of Search ............ 426/65, 175, 193, 221, 426/222

[56] References Cited

UNITED STATES PATENTS

| | | | |
|---|---|---|---|
| 1,696,419 | 12/1928 | Staudinger et al. | 426/65 X |
| 2,369,612 | 2/1945 | Schirm | 260/609 R |
| 2,560,531 | 8/1951 | Kepais et al. | 260/590 X |

*Primary Examiner*—Joseph M. Golian
*Attorney, Agent, or Firm*—Bruno P. Struzzi; Daniel J. Donovan; Thomas R. Savoie

[57] ABSTRACT

Enhancement of coffee products is achieved by the addition of a grinder gas aroma produced by reacting methyl mercaptan with a mole excess of certain carbonyl compounds to produce a flavor and aroma mixture containing hemi-mercaptals and hemi-mercaptols.

6 Claims, No Drawings

SYNTHETIC GRINDER GAS AROMAS AND PROCESSES

This is a continuation, of application Ser. No. 18,296, filed March 10, 1970 and now abandoned.

BACKGROUND OF THE INVENTION

1. Field of the Invention

The present invention relates to the preparation of aroma normally present when fresh roasted coffee is ground, and methods of incorporating the aroma in regular and soluble coffee. Still more particularly, the invention relates to a synthetic grinder gas aroma produced by reacting methyl mercaptan and certain aldehydes and ketones. The synthetic aroma may either be incorporated in a carrier or in soluble coffee, or employed in concentrated form to enhance the aroma of coffee products.

2. Description of the Prior Art

In the field of flavor and aroma enhancement, it has been general practice to employ synthetic and naturally isolated compounds and compositions as enhancers. The enhancement of flavor, particularly coffee flavor, is extremely complex, since individual aromas and flavors contain literally hundreds of compounds, each of which produces to some degree an organoleptic impact. In general, knowledge of a specific aroma composition or compound does not allow one to predict other useful compounds and combinations, since compounds of greatly differing structure can produce the same flavor character, while compounds of similar structure frequently differ appreciably in taste. For many years, coffee technologists have searched for an aroma for enhancing coffee which would produce the aroma normally noticed when fresh roasted coffee is ground. This aroma is commonly known as grinder gas.

Many of the flavors and aromas employed today are derived directly from coffee, such as roasted coffee oil, steam volatile aroma fractions of roasted coffee, and the like. While these substances enhance soluble coffee flavor and impart desirable aroma, they are not of the type which could be characterized as grinder gas. Synthetic coffee aromas, such as those described in U.S. Pat. No. 1,696,419, have also been employed to enhance overall coffee flavor and aroma by mixing together compounds known to exist in coffee. However, as in the case of the above-mentioned patent, these aromas could not be characterized as a grinder gas aroma, but rather an attempt to enhance total coffee flavor and aroma employing a single additive composition.

Experience has established that in trying to enhance coffee flavor, either with naturally occurring or synthetically prepared aromas and flavors, it is better to employ specific compositions to obtain a specific result rather than to combine them into an overall coffee enhancer. This is because the combination of different aromas and flavors generally exhibit poor shelf stability. By the time the coffee product is consumed, the aromas have either chemically and/or physically been changed to such a degree that either no improvement is obtained or, in some cases, a reduction in consumer appeal is noted.

The complexity of coffee aromatization and the difficulties in obtaining a stable aroma have led researchers to seek a single composition which would be incorporated in coffee to produce a grinder gas aroma. Attempts made to trap natural grinder gas at low temperatures have proven unsuccessful due to the high cost of condensation equipment and the poor stability of the condensed grinder gas frost. Similar attempts have been made to synthetically reproduce the grinder gas aroma and have also met with serious shelf stability problems.

SUMMARY OF THE INVENTION

The general purpose of this invention is to provide compositions which will enhance coffee products by imparting to them a grinder gas aroma and flavor.

Flavor enhancement is achieved by the addition of a small but effective amount of a reaction mixture containing hemi-mercaptals and hemi-mercaptols, incorporated in a carrier if desired.

The reaction mixture is prepared by contacting methyl mercaptan with a mole excess of a mixture of carbonyl compounds, which must include acetone, acetaldehyde, butyraldehyde and lower alkane α-diketone.

The individual compounds are mixed together and then allowed to equilibrate in a finite time to produce the desired hemi-mercaptal and hemi-mercaptol containing aroma.

Methyl mercaptan is the only mercaptan which will produce the desired grinder gas aroma when reacted with the preceding carbonyl compounds.

It is an object of this invention to provide synthetic grinder gas aromas and coffee enhancers prepared therefrom.

It is a further object of this invention to describe a process employing methyl mercaptan and specific aldehydes and ketones to provide a useful coffee grinder gas aroma.

DESCRIPTION OF THE INVENTION

The aromas of this invention are prepared by the following process:

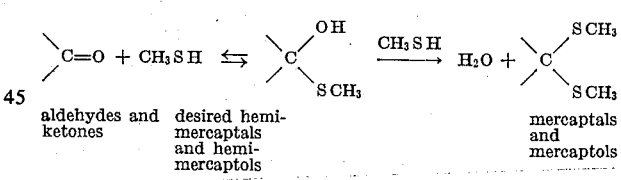

aldehydes and ketones → desired hemi-mercaptals and hemi-mercaptols → mercaptals and mercaptols Methyl mercaptan is the only mercaptan which will produce the desired grinder gas aroma when reacted with the preceding carbonyl compounds. The higher mercaptans will not react with carbonyls to any appreciable extent in an uncatalysed system. The presence of the unreacted mercaptan results in a foul smelling mixture which is undesirable at any concentration. The use of acid catalysts to promote the reaction will, in a few instances, give products which are desirable in coffee but in no instance will it give the desired grinder gas aroma. The presence of the catalyst promotes the formation of the mercaptal and mercaptol which usually have a spicy or minty aroma.

While hydrogen sulfide in minute amounts may initially contribute to a desirable grinder gas aroma, it seriously influences the shelf stability of the aroma and cannot be employed for this reason.

The proportions of the reactants must be chosen to promote the formation of the desired hemi-mercaptals and hemi-mercaptols and to prevent both dissociation to the starting materials and formation of the mercaptal or mercaptol. Dissociation is undesirable because the free methyl mercaptan has a foul, obnoxious aroma and is available to react with the remaining hemi-mercaptal or hemi-mercaptol to form the undesirable mercaptal or mercaptol. The desired results are obtained by using a molar excess of carbonyl compounds over mercaptan. Desired shelf stability can usually be achieved with a 3:1 ratio. However, in the formulation of well balanced flavors, we generally find it advantageous to work in the range of 20:1 to 50:1. It is of interest to note that the concentration of total flavor required per cup of beverage is generally directly proportional to this ratio.

The aroma is prepared by contacting methyl mercaptan with a molar excess of specific carbonyl compounds; namely, acetone, acetaldehyde, butyraldehyde and lower alkane α-diketone.

Isovaleraldehyde, while not necessary for a flavorful and stable grinder gas aroma may be incorporated to give a slightly better balanced flavor and aroma to the grinder gas. Other aldehydes and ketones, while they may react, do not improve over the grinder gas formulation of this invention and in some cases detract from its flavor, aroma and stability characteristics. The preferred butyraldehyde for use in the formulation of this invention is isobutyraldehyde.

A lower alkane α-diketone, generally lower carbon members such as 2,3-butanedione or 2,3-pentanedione, must be employed in the composition of this invention. While mixtures of diketones may be employed, it is preferred to employ a single diketone, particularly 2,3-butanedione.

Other additives, such as dimethyl sulfide, pyridine and the like, may be added to the mixture if desired, but do not take place in the reaction and are not critical for the development of grinder gas aroma.

The final reaction mixture is sealed and stored at low temperatures to prevent oxidation of free methyl mercaptan, ketones and aldehydes remaining unreacted. If desired, the aroma may be stored in any carrier in which the aroma is stable. Storage may be in oils like coffee oil, dry carriers like soluble coffee, aprotic solvents such as triacetin, and liquid carbon dioxide, or in other art-recognized edible carriers.

The final reaction mixture or grinder gas aroma is added to coffee products at a level of about 0.1 to 10 mg per cup of soluble coffee having 1.35 percent solids. Usually, about 0.5 mg to 6 mg of aroma per cup is sufficient. Selection of a good aroma concentration for the particular coffee enhanced is a routine matter for one of ordinary skill in the art.

While added to brewed coffee for initially experimental evaluation, the aroma may be incorporated in commercial coffee products such as roasted and ground coffee, freeze-dried coffee, spray-dried coffee, brewed coffee or the like, whether decaffeinated or not, by any suitable art-recognized method. For instance, the aroma may be incorporated in coffee oil or other edible carrier and sprayed on soluble coffee prior to packaging. It may be incorporated in soluble coffee by mixing the aroma with coffee extract and then spray drying, freeze drying or otherwise fixing the aroma in a portion or all of the recovered dry coffee product. The aroma may alternatively be incorporated in a liquefied gas such as carbon dioxide, fluorocarbons or the like, and placed in the jar of soluble coffee or can of regular coffee just prior to sealing. This latter method is desirable where an initially strong grinder gas aroma is desired when the package is opened.

The grinder gas aroma is prepared by mixing together methyl mercaptan and the carbonyl compounds; namely, acetone, acetaldehyde, butyraldehyde and lower alkane α-diketone at a temperature of about 5°C to about 40°C. Temperature is not critical, but good aroma is obtained within these temperatures. The reaction mixture is maintained within the temperature range for a period of time sufficient to approach equilibrium and to develop the aroma, generally at least 10 minutes. The reaction may be carried out in solvent, either polar or non-polar, if desired.

The invention is illustrated, but not limited by, the following specific example of the preparation of grinder gas aroma. It will be recognized that various additions and modifications can be made without deviating from the scope of the invention.

EXAMPLE

The individual ingredients are removed from freezer storage and the desired quantity of each pipetted into a vial cooled by dry ice or other refrigerant. After all the ingredients are added, the vial is closed, shaken, and the mixture stored in a refrigerator.

The aroma of the combined mixture is tested by adding several drops of the mixture to mineral oil and then evaluating aroma and/or by addition to coffee beverage and tasting.

The following table is a summary of typical grinder gas formulations of this invention:

COMPONENT - MOLES

| Example | Acetone | Acet-Aldehyde | Iso-butyraldehyde | Lower Alkane α-di-Ketone | Methyl Mercaptan | Isovaleraldehyde | Methyl Sulfide | Pyridine | Total >C=O | Ratio >C=O to MeSH |
|---------|---------|---------------|-------------------|--------------------------|------------------|------------------|----------------|----------|------------|---------------------|
| I | 0.62 | 1.05 | 0.06 | 0.11* | 0.08 | — | — | — | 1.84 | 23:1 |
| II | 0.62 | 1.05 | 0.03 | 0.11* | 0.08 | 0.03 | — | — | 1.84 | 23:1 |
| III | 0.33 | 1.43 | 0.01 | 0.09* | 0.04 | 0.03 | 0.08 | 0.002 | 1.89 | 47:1 |
| IV | 0.53 | .91 | 0.02 | 0.15* | 0.07 | 0.04 | 1.24 | 0.004 | 1.65 | 24:1 |
| V | 0.48 | 1.27 | 0.01 | 0.08* | 0.04 | 0.02 | 0.07 | 0.002 | 1.86 | 46:1 |
| VI | 0.56 | .96 | 0.02 | 0.06* | 0.08 | .04 | 1.31 | 0.004 | 1.64 | 20:1 |
| VII | 0.75 | 1.07 | 0.04 | 0.06** | 0.08 | 0.03 | 0.01 | 0.005 | 1.95 | 24:1 |
| Range | 0.6–30 | 2–50 | 0.02–3 | 0.2–5 | 1.0 | 0.04–2 | — | — | 3–90 | 3:1–90:1 |

The grinder gas of this invention is stable and has an aroma similar to freshly ground roasted coffee. It is free from undesirable off odor and flavors, and is an excellent flavor and odor enhancer for coffee products.

What is claimed is:

1. A process for preparing synthetic grinder gas comprising contacting for each one mole of methyl mercaptan a molar excess of carbonyl compounds including 0.6 to 30 moles of acetone, 2 to 50 moles of acetaldehyde, 0.02 to 3 moles of butyraldehyde and 0.2 to 5 moles of a lower alkane α-diketone selected from the group consisting of 2,3-butanedione, 2,3-pentanedione and mixtures thereof to form a reaction mixture and maintaining said reaction mixture for a period of time sufficient to obtain a grinder gas aroma.

2. The process of claim 1 in which the reaction mixture further includes isovaleraldehyde, methyl sulfide and pyridine, the diketone is 2,3-butane dione, and the butyraldehyde is isobutyraldehyde.

3. The process of claim 1 in which from 3 to 90 moles of carbonyl compounds are employed for each one mole of methyl mercaptan.

4. A synthetic grinder gas aroma comprising a reaction mixture of a molar excess of carbonyl compounds including 0.6 to 30 moles of acetone, 2 to 50 moles of acetaldehyde, 0.02 to 3 moles of butyraldehyde and 0.2 to 5 moles of a lower alkane α-diketone from the group consisting of 2,3-butanedione, 2,3-pentanedione and mixtures thereof and in proportion one mole of methyl mercaptan.

5. The aroma of claim 4 which further includes isovaleraldehyde, methyl sulfide and pyridine, the diketone is 2,3-butanedione and the butyraldehyde is isobutyraldehyde.

6. A process for enhancing the aroma and flavor of coffee, either regular or soluble, decaffeinated regular or decaffeinated soluble comprising adding to the coffee a small but effective amount of the aroma of claim 4 to enhance the aroma and flavor of the coffee.

* * * * *

UNITED STATES PATENT OFFICE
CERTIFICATE OF CORRECTION

Patent No. 3,852,481      Dated     December 3, 1974

Inventor(s) Jacob R. Feldman et al.

It is certified that error appears in the above-identified patent and that said Letters Patent are hereby corrected as shown below:

In column 3, below last line of table "Component - Moles," add the following notations:

-- * 2,3-butanedione
       ** 2,3-pentanedione -- .

In column 4, in the table "Component - Moles," change heading second from last column from    "Total    to    -- Total
                $>$C=O"               $>$C=O -- ;

change heading in the last column from    "Ratio    to    -- Total
                $>$C=O                 $>$C=O
                to MeSH"           to MeSH -- .

Signed and Sealed this fifth Day of August 1975

[SEAL]

Attest:

RUTH C. MASON
*Attesting Officer*

C. MARSHALL DANN
*Commissioner of Patents and Trademarks*